Jan. 25, 1955 — W. D. ANDERSON — 2,700,298
TORQUE MEASURING DEVICE
Filed March 21, 1952 — 2 Sheets-Sheet 1

INVENTOR.
Warren D. Anderson
BY C. P. Goepel
his ATTORNEY

Jan. 25, 1955 W. D. ANDERSON 2,700,298
TORQUE MEASURING DEVICE
Filed March 21, 1952 2 Sheets-Sheet 2
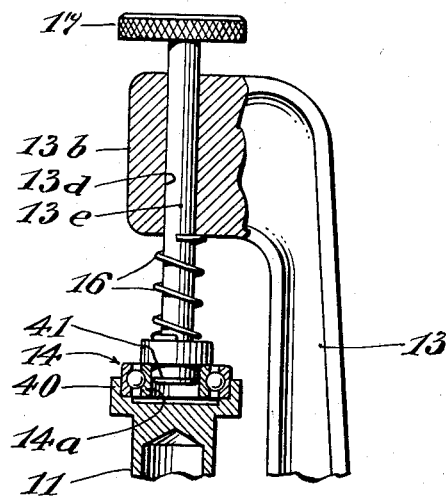
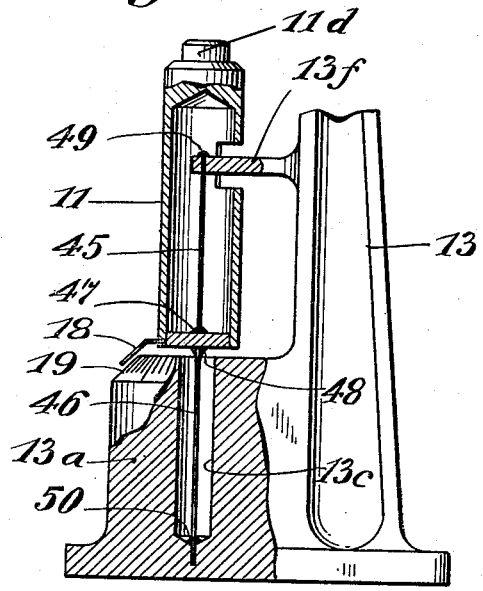
INVENTOR.
Warren D. Anderson
BY C. P. Goepel
his ATTORNEY

United States Patent Office 2,700,298
Patented Jan. 25, 1955

2,700,298

TORQUE MEASURING DEVICE

Warren D. Anderson, Glenbrook, Conn., assignor to Norma-Hoffmann Bearings Corporation, Stamford, Conn., a corporation of New York Application March 21, 1952, Serial No. 277,828

3 Claims. (Cl. 73—9)

This invention relates to a device for accurately measuring very small values of torque and more particularly one application of said invention is for measuring the frictional torque developed in a ball bearing while rotating.

In recent years the increasingly severe requirements for accuracy in such devices as gyroscopic flight instruments, fire control instruments, self-synchronous electric motors, and various control mechanisms have resulted in correspondingly severe requirements for accuracy and minimum frictional torque in the ball bearings used in such devices. In such bearings the permissible frictional torque is of the order of magnitude of .001 lb. inches. In order to qualify bearings for such devices it is desirable that the bearings be torque tested prior to use.

The present invention utilizes a taut torsion wire which serves to measure torque, to impose an axial thrust load upon the bearing, and to maintain a positive colinear relationship between the axes of the ball bearing inner ring and outer ring. These functions are accomplished without the necessity of fastening the torsion wire to the bearing by devices such as a threaded nut, bayonet lock, or similar device, which devices waste a considerable amount of time in applying the torque tester to the bearing and also aggravate the hazard of dirt being introduced into the bearing during the torque measurement. The improved torque measuring device is simple, reliable, and may be quickly applied and removed from the bearing, thus making it suitable for measuring the torque of ball bearings or other articles on a mass production basis.

Frequently errors in a bearing being tested tend to cause the shaft of a torque measuring device as heretofore proposed to assume an angular misalignment, the amount of misalignment being limited, among other things, by the amount of tension in the torsion wire. However, the tension in the wire can be no greater than the amount of thrust load which is exerted on the bearing during the test. This thrust load is usually quite small, and then the tension in the wire is not sufficiently great to maintain positive colinearity of the axes of the inner and outer rings. This objection is overcome by the present invention since a very large tension in the wire is capable of being used irrespective of the amount of thrust load imposed upon the bearing, whereby a positive colinearity of the inner and outer ring axes is maintained.

The invention consists in the use of a frame, a torque transmitting shaft, and a taut torsion wire coaxial with the rotational axis of said shaft, so combined that said torsion wire forms more than one connection between said shaft and said frame.

The embodiments show various forms of this concept, in that in one, said torsion wire has both of its terminal points secured to the frame, and a non-terminal point of said torsion wire secured to said shaft, in another embodiment said torsion wire has both of its terminal points secured to said shaft and a non-terminal point secured to said frame.

In use, the bearing is rotated while it is connected to one end of a coaxial shaft, said shaft being held in position relative to a frame by a taut coaxial torsion wire, which forms more than one connection between the shaft and the frame.

The invention will be more fully described hereinafter, embodiments thereof shown in the drawings, and the invention will be finally pointed out in the claims.

In the accompanying drawings,

Fig. 4 illustrates a fragmentary view of a modification of the torque measuring device shown in Figs. 1 and 3, wherein the shaft is attached to the outer ring of the bearing rather than to the inner ring as in Figures 1 and 3; and Fig. 5 illustrates another modification of the torque measuring device, in which two torsion wires are shown.

Similar characters of reference indicate corresponding parts throughout the various views.

Figure 1:
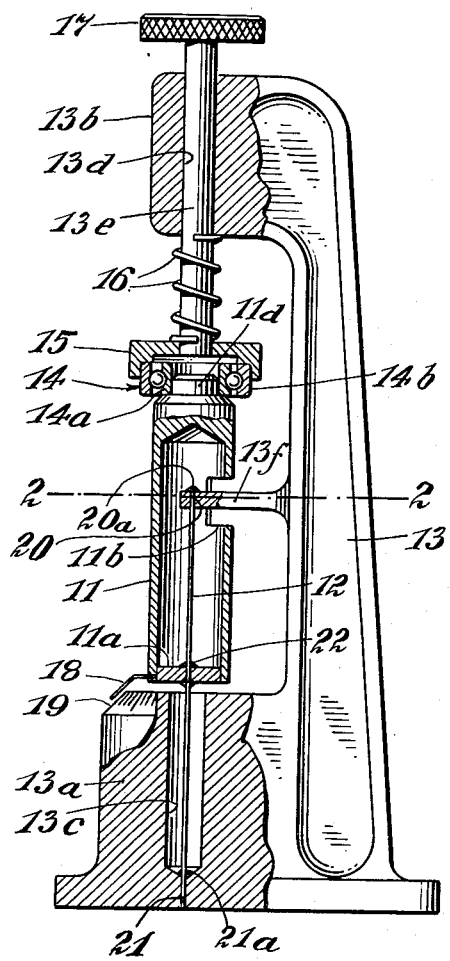
Figure 1 is a partial section view of a ball bearing tester incorporating the torque measuring device which is the subject of this patent in which embodiment the terminal points of the torsion wire are secured to the frame and a non-terminal point is secured to the shaft.

Referring to Fig. 1, a frame 13 has a base portion 13a, and an upper portion 13b. The base portion 13a has a vertical bore 13c, and the upper portion has a bore 13d for the passage of a shaft 13e. Intermediate the base portion and the upper portion is a bracket portion 13f. The base portion 13a has a beveled part with scale markings 19.

A torsion wire 12 has one terminal point secured to the bracket 13f and extends to the inner side of a bottom 11a of a hollow shaft 11. This wire then extends through the bottom 11a and at its lower terminal point, is secured at 21 to the bottom of the bore 13c of the base portion 13a.

Figure 2:
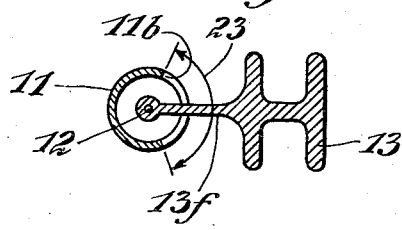
Fig. 2 is a horizontal sectional view of the torque measuring device taken on line 2—2 of Fig. 1.

Referring to Fig. 2, the shaft 11, has a cut out 11b of arcuate shape through which the bracket 13f projects into the interior of the shaft 11.

The shaft 11, cylindrical in the embodiment shown, has a central upwardly extending cylindrical projection 11d. Upon the upper end of the shaft, is placed an inner ring 14a of a ball bearing, whose bore has a diameter substantially equal to that of the projection 11d. The outer ring 14b of the bearing is within an inverted cup 15, secured to the shaft 13e. A helical spring 16 is disposed around the shaft 13e, and has one end against the upper portion 13b of the frame 13, and the other end against the cup 15. The shaft 13e has a knurled knob 17 on its upper free end.

One terminal point 20 of the torsion wire 12 is secured to the frame 13 at the attachment point 20a. The other terminal point 21 of the torsion wire 12 is secured to the frame 13 at the attachment point 21a.

The ball bearing 14 supported by shaft 11 is positioned and loaded in thrust by cup 15 and spring 16.

The lower end of shaft 11 is fastened by solder or other suitable means at point 22 to a non-terminal point on the torsion wire 12. Torsion wire 12 is in turn mounted or secured under initial tension to the frame 13 at the terminal points 20 and 21. The amount of initial tension in torsion wire 12 can be much larger than the thrust exerted by spring 16, so that the axis of the shaft 11 and the axis of the inner ring of the ball bearing 14 will maintain a fixed position relative to the axis of the outer ring of ball bearing 14. In other words, the initial tension in the torsion wire 12 is made sufficiently large so that dimensional errors in ball bearing 14 and the thrust of spring 16 will cause only negligible lateral displacement of point 22.

An indicating pointer 18 is arranged on the lower end of the rotatable shaft 11 in close proximity to the bevelled graduated scale 19 to indicate the angular movement of the shaft 11 relative to the stationary base portion 13a of the frame 13.

Such angular movement of the shaft 11 is permitted by the arcuate opening formed by the cut out 11b as indicated in Figure 2, the arc 23 showing the angular extent of the opening 11b.

In operation, the knob 17 on the shaft 13e is lifted sufficiently to allow bearing 14 to be placed on the projection 11d of the shaft 11, after which the knob is lowered so that spring 16 seats cup 15 against the upper side of the outer ring 14b of bearing 14. The thrust load exerted by spring 16 and cup 15 is now transmitted through bearing 14 to the shaft 11, then through torsion wire 12 to frame 13. As yet no frictional torques have been exerted to cause rotation of shaft 11.

The knob 17 is now rotated by hand, clock or anti-clockwise, thus rotating the outer ring 14b of bearing 14 with the result that any frictional torque developed within the bearing will be transmitted to shaft 11 which will cause an angular rotation of shaft 11 and torsion wire 12 secured thereto. The amount of rotation will be proportional to the frictional torque developed within bearing 14 and will be indicated by pointer 18 against scale 19 on the base portion 13a.

Figure 3:
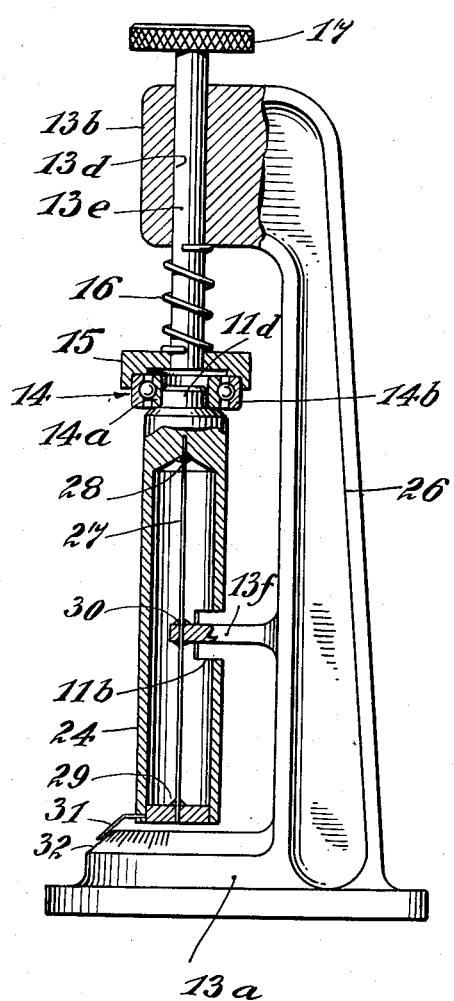
Fig. 3 illustrates a modification of the torque measuring device shown in Fig. 1 in which the terminal points of the torsion wire are secured to the shaft, and a non-terminal point of said torsion wire is secured to the frame.

Figure 3 shows a modification of the torque measuring device, wherein torsion wire 27 under initial tension has its terminal points 28 and 29 fastened to shaft 24. A non-terminal point 30 of the torsion wire is fastened to the bracket 13f of the frame 26. Pointer 31 indicates rotation of shaft 24 against scale 32. The operation of this modified device is similar to that described for the device shown in Figure 1.

Figure 4 shows a further modification of the device shown in Figure 1 wherein the outer ring of ball bearing 14 is now supported by cup 40 on the shaft 11, and the inner ring of ball bearing 14 is fitted against shoulder 41 on shaft 13e. The operation of this modified device is similar to that described for Figure 1.

Figure 5 illustrates another modification of the device shown in Figure 1 wherein two torsion wires 45 and 46 under initial tension are attached to the lower end of shaft 11 at points 47 and 48 with the terminal points 49 and 50 secured or anchored to frame 13. This modification has the advantage that torsion wires 45 and 46 may be of different diameters if so desired. It will be noted that the torsion wires 45 and 46 are separate wires instead of one continuous wire as in Fig. 1. The operation of this modified device is similar to that described for Figure 1.

In each of the embodiments, the torsion wire forms more than one connection between the shaft and frame. For example, in Fig. 1, the torsion wire 12 has both of its terminal points connected with the frame thus forming more than one connection between the shaft and the frame. This is also present for the embodiment shown in Fig. 5. In Fig. 3, both terminal points of the torsion wire 27 being connected with the shaft 24 and the non-terminal part of the torsion wire 27 being connected with the frame, thus forming more than one connection between the shaft and the frame.

While the testing of ball bearings has been shown, other articles may be tested.

I wish it to be understood that I do not desire to be limited to the exact details of construction shown and described, for obvious modifications will occur to a person skilled in the art.

I claim:

1. In a device for measuring the frictional torque of a ball bearing having an axis of rotation, the combination of a frame, a taut torsion wire coaxial with said bearing axis, and a coaxial torque transmitting shaft connecting said bearing to said torsion wire, said torsion wire being partially surrounded by said shaft, and having both of its terminal ends secured to said frame, and a non-terminal point of said torsion wire secured to said coaxial torque transmitting shaft.

2. In a torque measuring device, the combination of a frame, a torque transmitting shaft, and a taut torque measuring wire coaxial with the rotational axis of said shaft, said torque measuring wire being partially surrounded by said shaft and forming more than one connection between said shaft and said frame, at least one connection between said shaft and said torque measuring wire being at one extremity of said shaft and at least one connection between said frame and said torque measuring wire being between the two extremities of said shaft.

3. In a device for measuring the frictional torque of a ball bearing having an axis of rotation, the combination of a frame, a taut torque measuring wire coaxial with said bearing axis, and a torque transmitting shaft, said torque measuring wire being partially surrounded by said shaft and having both of its terminals secured to said shaft and a non-terminal point secured to said frame between the two extremities of said shaft.

References Cited in the file of this patent

UNITED STATES PATENTS

| | | |
|---|---|---|
| 2,394,022 | Storrie | Feb. 5, 1946 |
| 2,398,574 | Bell | Apr. 16, 1946 |
| 2,420,385 | Slusher | May 13, 1947 |
| 2,471,423 | Gisser | May 31, 1949 |
| 2,574,395 | Jack | Nov. 6, 1951 |

FOREIGN PATENTS

| | | |
|---|---|---|
| 437,168 | Great Britain | Oct. 24, 1935 |